(12) United States Patent
Hazan et al.

(10) Patent No.: US 10,832,407 B2
(45) Date of Patent: Nov. 10, 2020

(54) TRAINING A NEURAL NETWORK ADAPTER

(71) Applicant: International Business Machines Corporation, Armonk, NY (US)

(72) Inventors: Alon Hazan, Zikhron Yaakov (IL); Yoel Shoshan, Haifa (IL); Vadim Ratner, Haifa (IL); Aviad Zlotnick, Mitzpeh Netofah (IL); Flora Gilboa, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/293,667

(22) Filed: Mar. 6, 2019

(65) Prior Publication Data

US 2020/0286221 A1 Sep. 10, 2020

(51) Int. Cl.
*G06K 9/00* (2006.01)
*G06E 1/00* (2006.01)
*G06T 7/00* (2017.01)
*G06N 3/08* (2006.01)
*G06N 3/04* (2006.01)

(52) U.S. Cl.
CPC ......... *G06T 7/0012* (2013.01); *G06N 3/0454* (2013.01); *G06N 3/0481* (2013.01); *G06N 3/084* (2013.01); *G06T 2207/10088* (2013.01); *G06T 2207/10116* (2013.01); *G06T 2207/20081* (2013.01); *G06T 2207/20084* (2013.01)

(58) Field of Classification Search
USPC ....... 382/100, 103, 106, 168, 173, 181, 219, 382/220, 224, 254, 276, 291, 305; 378/4, 378/21; 706/20, 6
See application file for complete search history.

(56) References Cited

U.S. PATENT DOCUMENTS

| 8,255,412 B2 | 8/2012 | Gao et al. | |
| 2015/0324688 A1* | 11/2015 | Wierzynski | G06N 3/08 706/20 |
| 2017/0243114 A1* | 8/2017 | Kurata | G06N 3/0472 |
| 2018/0165603 A1* | 6/2018 | Van Seijen | G06N 5/043 |
| 2018/0330238 A1* | 11/2018 | Luciw | G06N 3/0445 |

(Continued)

OTHER PUBLICATIONS

Sylvestre-Alvise Rebuffi et al., "Learning Multiple Visual Domains with Residual Adapters", Cornell University Library, Nov. 27, 2017, pp. 1-12, arXiv.org.

(Continued)

*Primary Examiner* — Seyed H Azarian
(74) *Attorney, Agent, or Firm* — Barry D. Blount (57) ABSTRACT

In some examples, a system for training a neural network can include a processor to detect a trained neural network application. The processor can also detect a set of images, wherein the neural network application is not trained with the set of images. Additionally, the processor can train an adapter network based on the trained neural network application and the set of images, wherein the adapter network is to be trained by freezing weights of the trained neural network and modifying weights of the adapter network. Furthermore, the processor can use the trained adapter network to process at least one additional image, the processed additional image to be transmitted to the trained neural network to generate an output signal.

18 Claims, 6 Drawing Sheets

(56) References Cited

U.S. PATENT DOCUMENTS

2019/0244108 A1\* 8/2019 Meyerson ............... G06N 3/04
2019/0333198 A1\* 10/2019 Wang .................. G06N 3/0454

OTHER PUBLICATIONS

Artem Rozantsev et al., "Residual Parameter Transfer for Deep Domain Adaptation", Cornell University Library, Nov. 21, 2017, pp. 1-11, arXiv.org.

\* cited by examiner

TRAINING A NEURAL NETWORK ADAPTER

BACKGROUND

The present disclosure relates to techniques for training a neural network, and more specifically, but not exclusively, to training a network adapter to modify images to be used as input for a neural network.

SUMMARY

According to an embodiment described herein, a system for training an adapter network can include a processor to detect a trained neural network application and detect a set of images, wherein the neural network application is not trained with the set of images. The processor can also train an adapter network based on the trained neural network application and the set of images, wherein the adapter network is to be trained by freezing weights of the trained neural network and modifying weights of the adapter network. Furthermore, the processor can use the trained adapter network to process at least one additional image, the processed additional image to be transmitted to the trained neural network to generate an output signal.

In some embodiments, a method for training an adapter network can include detecting a trained neural network application and detecting a set of images, wherein the neural network application is not trained with the set of images. The method can also include training an adapter network based on the trained neural network application and the set of images, wherein the adapter network is to be trained by freezing weights of the trained neural network and modifying weights of the adapter network. Furthermore, the method can include using the trained adapter network to process at least one additional image, the processed additional image to be transmitted to the trained neural network to generate an output signal.

In yet another embodiment, a computer program product for training an adapter network can include a computer readable storage medium having program instructions embodied therewith, wherein the computer readable storage medium is not a transitory signal per se. The program instructions can be executable by a processor to cause the processor to detect a trained neural network application and detect a set of images, wherein the neural network application is not trained with the set of images. The processor can also train an adapter network based on the trained neural network application and the set of images, wherein the adapter network is to be trained by freezing weights of the trained neural network and modifying weights of the adapter network. Furthermore, the processor can use the trained adapter network to process at least one additional image, the processed additional image to be transmitted to the trained neural network to generate an output signal.

DETAILED DESCRIPTION

Deep neural networks have demonstrated impressive performance in various machine learning tasks. However, deep neural networks can be sensitive to changes in data distribution. In some examples, even a slight change in the data distribution can lead to a substantial performance reduction. Artificially augmenting the data may help to some extent, but generally fails to achieve model invariance to the data distribution. Some examples where this sub-class of domain adaptation can be valuable include various imaging modalities such as thermal imaging, X-ray, ultrasound, and MRI, where changes in acquisition parameters or an acquisition device sensor will result in different representations of the same input. In some embodiments, standard fine-tuning fails to adapt the model in certain cases. Accordingly, techniques herein include adapting a deep neural network to a new data source. Moreover, techniques herein do not require any samples from the original data set.

When training neural networks for a certain task on a specific dataset, it is difficult to guarantee adequate performance on data that has even a slightly different distribution. This challenge gives rise to the field of domain adaptation, which attempts to alter a source domain to bring its distribution closer to that of the target. In some examples, fine-tuning can initialize the network to previously learned weights and then retrain the network based on the new data set, usually with a lower learning rate. The training is almost always limited to the last few layers of the network, while keeping the rest of the network fixed. In practice, sometimes the dataset used to train the original model is not available due to legal issues, privacy concerns, or logistics, and fine-tuning does not require the original data.

The techniques herein can outperform the fine-tuning approach. The techniques herein do not retrain a subset of the pre-trained model weights. Rather, techniques herein train an additional adapter network that transforms the input before the input is passed to the original pretrained neural network model, while keeping the original neural network model intact. The techniques herein can overcome the data distribution gap, where both naive inference and fine-tuning approaches fail. In some embodiments, the techniques herein differ from training the bottom layers of the deep neural network. For example, the adapter network can be detached from the original model after training, allowing the observation of the output image after adaptation to make sure the adapter network is not destructive and provides explainability. Secondly, unlike the bottom layers of the neural network which are predetermined, by adding an adapter network, full control of its architecture is achieved. This allows controlling the adapter network's capacity and tailoring the network adapter to the expected task e.g., allowing only color change, etc. Furthermore, the techniques herein are not limited to classification tasks or to image related targets. Rather, the techniques herein can be used for segmentation, detection, semantic segmentation, and sequence prediction, among others.

In some embodiments, a method includes creating and training an adapter network to transform data from a new data source to the original data distribution. For the adapter network, a shallow convolutional neural network can be used to enforce a low capacity. However, any model architecture can be used, depending on the expected complexity of the required transformation, and on the amount of training data (from the new data set). To train the adapter network, the original pre-trained network can be used together with the original loss function as a single large loss function. In other words, the method can include freezing the weights of the original network and adding the adapter network before the input. In some embodiments, the method can include training the adapter network with supervision samples from the new data set. Since the adapter network can be a shallow network, training the adapter network uses fewer samples than is required to train a full new network and as such, the adapter network trains quickly. The adapter network can learn by doing the same task that was used to train the original network (e.g., classification, etc.). However, since the adapter network is connected to a pre-trained network and the capacity of the adapter network is limited due to the small number of parameters, the adapter network is expected to learn the representation transformation.

As discussed in greater detail below in relation to FIGS. 1-4, in some embodiments, a device can detect a trained neural network application. The device can also detect a set of images, wherein the neural network application is not trained with the set of images. Additionally, the device can train an adapter network based on the trained neural network application and the set of images, wherein the adapter network is to be trained by freezing weights of the trained neural network and modifying weights of the adapter network. Furthermore, the device can use the trained adapter network to process at least one additional image, the processed additional image to be transmitted to the trained neural network to generate an output signal.

The present techniques do not require any samples from the original data set and can be detached and used as standalone image adapter. Additionally, the present techniques can be tailored architecturally to a specific task and can use a small amount of samples from the new data set.

Figure 1:
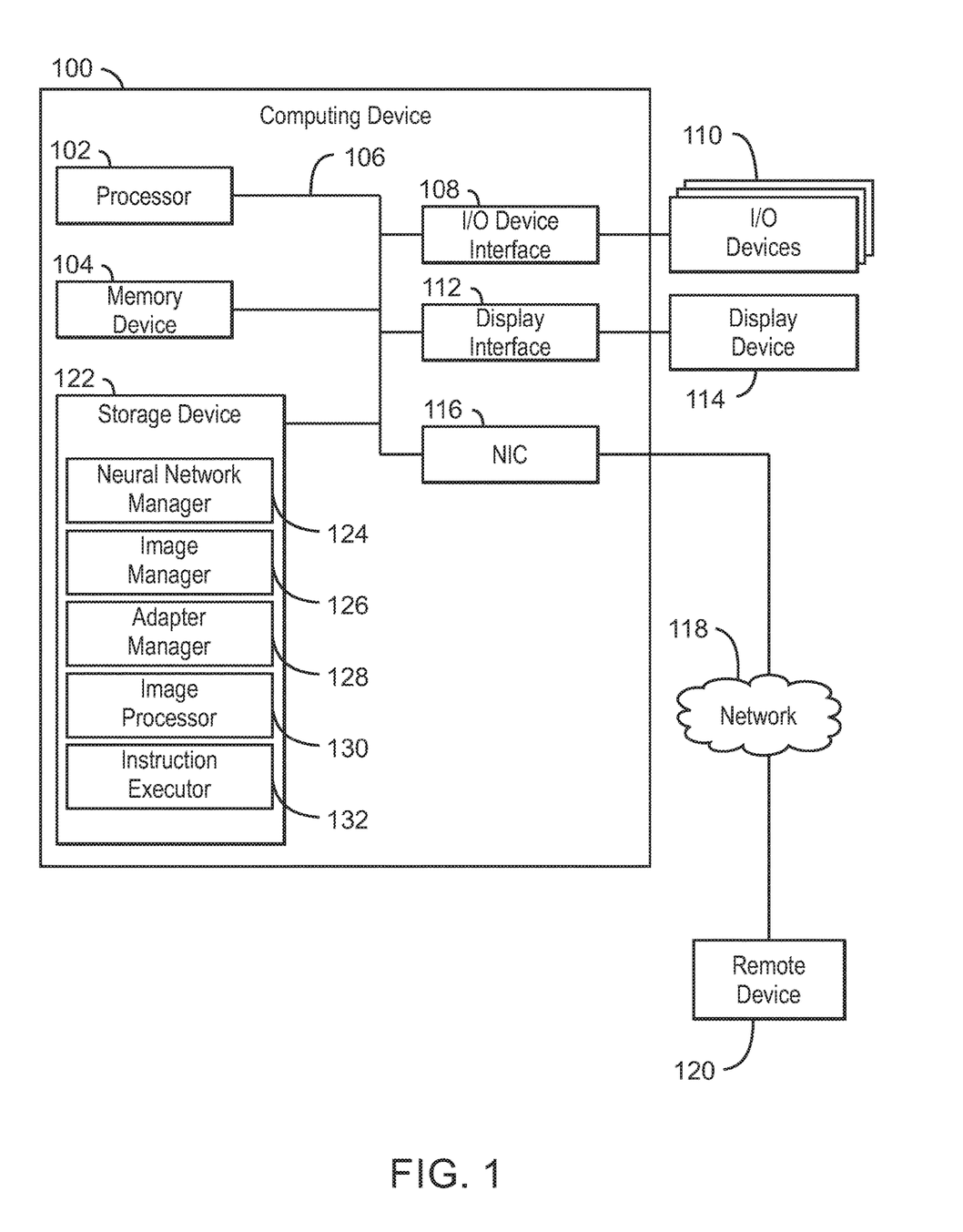
FIG. 1 depicts a block diagram of an example computing system that can train an adapter network to be used with a trained neural network according to an embodiment described herein.

With reference now to FIG. 1, an example computing device is depicted that can train an adapter network to be used with a trained neural network. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote device 120 may connect to the computing device 100 through the network 118.

In some examples, the processor 102 can be linked through the system interconnect 106 to the storage device 122, which can include a neural network manager 124, an image manager 126, an adapter manager 128, an image processor 130, and an instruction executor 132. In some embodiments, the neural network manager 124 can detect a trained neural network application. The image manager 126 can detect a set of images, wherein the neural network application is not trained with the set of images. The adapter manager 128 can train an adapter network based on the trained neural network application and the set of images, wherein the adapter network is to be trained by freezing weights of the trained neural network and modifying weights of the adapter network. Furthermore, the image processor 130 can use the trained adapter network to process at least one additional image, the processed additional image to be transmitted to the trained neural network to generate an output signal. In addition, the instruction executor 132 can execute or process an instruction based on the trained deep neural network and the adapter network.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the neural network manager 124, image manager 126, adapter manager 128, image processor 130, and instruction executor 132 are partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the neural network manager 124, image manager 126, adapter manager 128, image processor 130, and instruction executor 132 can be implemented with logic, wherein the logic, as referred to herein, can include any suitable hardware (e.g., a processor, among others), software (e.g., an application, among others), firmware, or any suitable combination of hardware, software, and firmware.

Figure 2:
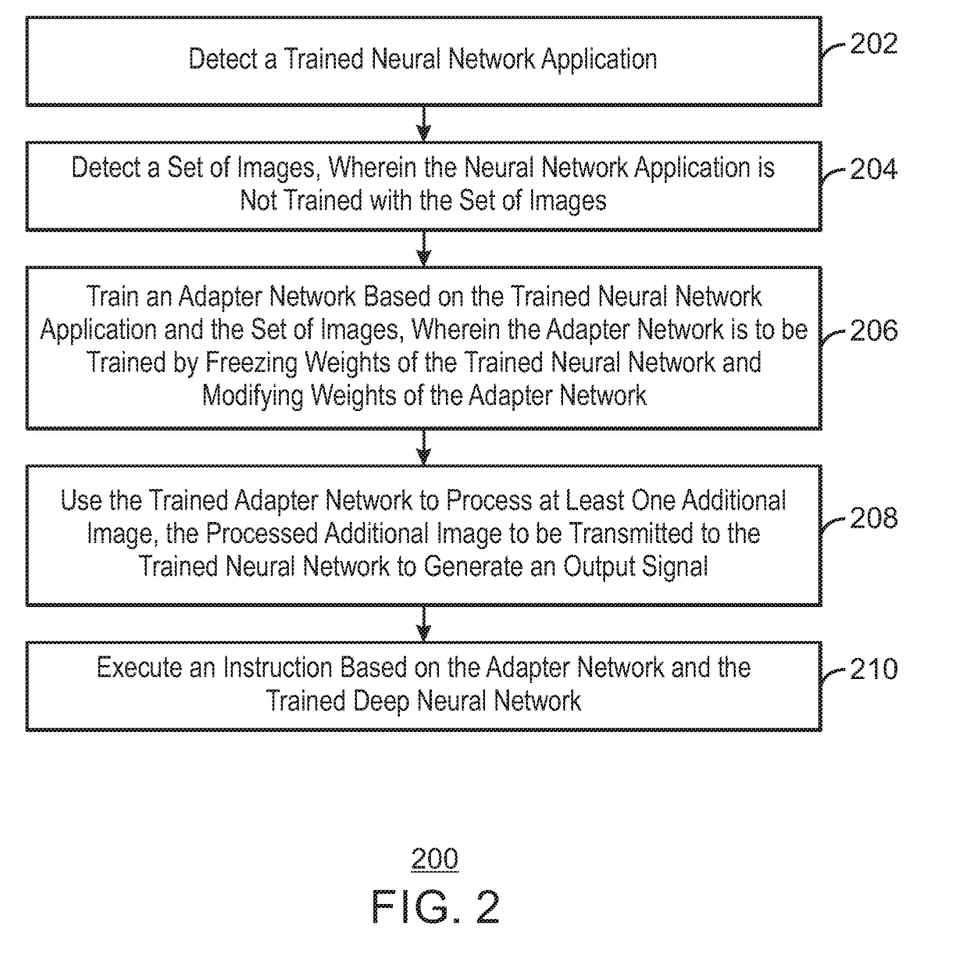
FIG. 2 is a process flow diagram of an example method that can train an adapter network to be used with a trained neural network according to an embodiment described herein.

FIG. 2 is a process flow diagram of an example method that can train an adapter network to be used with a trained neural network. The method 200 can be implemented with any suitable computing device, such as the computing device 100 of FIG. 1.

At block 202, the neural network manager 124 can detect a trained neural network application. In some embodiments, the trained neural network application can include any number of neurons and layers of neurons. The neural network can be trained to detect or classify objects in images, detect text from images, and the like. The neural network can also be trained for segmentation, detection, semantic segmentation, and sequence prediction. In some embodiments, the trained neural network can include any suitable weights assigned to each neuron in order to generate expected results.

At block 204, an image manager 126 can detect a set of images, wherein the neural network application is not trained with the set of images. In some embodiments, the set of images can include images from a device that was not used to train the neural network. In some examples, the set of images can include medical images captured from a different device than the test images used to train the neural network application. In some embodiments, the set of images can also include medical images captured from the same device which captured the test images. In some examples, the set of images can be captured after a period of time or with different calibration settings applied to the device. For example, the set of images may be captured with a different degree of contrast, brightness, and the like in comparison to the test images.

At block 206, an adapter manager 128 can train an adapter network based on the trained neural network application and the set of images. In some embodiments, the adapter network can be trained by freezing weights of the trained neural network and modifying weights of the adapter network. For example, the adapter network can be initially trained based on a pass through function that does not modify the images. The adapter network can modify the weights following initialization so that characteristics of the detected images correspond to characteristics of the test images used to train the neural network. In some embodiments, the adapter network can be limited to particular modifications. For example, the adapter network can be limited to modifying a single characteristic of an image such as a size of the image, a scale of the image, a color of the image, or a hue of the image, among others. In some embodiments, the weights of the neural network are frozen or remain static and any suitable backpropagation technique is applied to the weights of the adapter network. For example, the neural network can be used as a loss function to train the adapter network. The adapter network, when trained, can modify the set of images to match characteristics of the test images used to train the neural network.

In some embodiments, initialization of the adapter network's weights can determine the success of the training. In some examples, the method can include initializing the adapter to begin as an identity function, which means that before training starts the adapter function is effectively $F(x)=x$. In some embodiments, this is achieved by using a rectified linear unit (Relu) activation and providing inputs that are greater or equal to zero to guarantee the identity function starting point. In some examples, the method can include transforming the input data into a range such as from zero to one. In some embodiments, the suggested convolutional layers are spatially 1×1 with 3 channels; therefore, the convolutional layers allow information mixture between channels. However, in the identity initialization, the method can include enforcing zero weights for inter-channel connections and unit weights for intra-channel connections. Accordingly, initially the network adapter is an identity function, regardless of the number of chosen convolutional layers.

At block 208, an image processor 130 can use the trained adapter network to process at least one additional image. In some examples, the processed additional image can be transmitted to the trained neural network to generate an output signal. The processed image can include a modified color, hue, saturation, and/or brightness of an image. The processed image can also include a modified scaling of an image or a modified skew of a perspective corresponding to an image. In some embodiments, the trained adapter network can modify a sigmoid function to enable analyzing images captured with a device using different calibration settings. For example, the modified sigmoid function can process different x-ray images from a single x-ray device in response to detecting the x-ray images were captured based on different settings such as brightness, saturation, and the like. In some examples, the modified sigmoid function can enable processing images captured by a single device that has experienced degradation over time. Accordingly, the trained adapter network can modify or normalize image characteristics such as the brightness, saturation, hue, or color of images captured by a single device so that images captured after a period of time share the same image characteristics as the images initially captured by the device. In some embodiments, the trained adapter network can normalize medical images based on an age of a device capturing the medical images, wherein the device can be an x-ray device, magnetic resonance imaging (MRI) device, ultrasound device, and the like. Accordingly, the output signal can indicate a medical condition corresponding to the at least one image, wherein the at least one image is an x-ray image, ultrasound image, or MRI image. In some examples, the output signal can include a classification of an object from an image, a string of text detected from an audio signal, and the like.

At block 210, the instruction executor 132 can execute or process an instruction based on the trained deep neural network and the adapter network. For example, the instruction executor 132 can execute an operation that detects medical conditions in medical images and transmits a warning to a remote device. The instruction executor 132 can also execute an operation that analyzes the adapter network to determine that the adapter network did not perform any destructive or permanent modifications to the detected set of images. Accordingly, the set of images can be viewed in their original unmodified state. In some embodiments, the adapter network can enable using a single device in multiple locations without recalibrating the device following a move to a new location.

In some embodiments, the instruction executor 132 can execute an instruction with the adapter network and the trained deep neural network, which can perform classification, segmentation, detection, semantic segmentation, and sequence prediction, among others. For example, the instruction can include performing segmentation with images to remove a background from a foreground to enable object detection. In some embodiments, the instruction executor 132 can identify objects in an image with the adapter network and the trained deep neural network based on labels generated for each pixel of the image.

The process flow diagram of FIG. 2 is not intended to indicate that the operations of the method 200 are to be executed in any particular order, or that all of the operations of the method 200 are to be included in every case. Additionally, the method 200 can include additional operations. For example, the processed additional image can include characteristics shared with a sample image from a first image capturing device, wherein the processed additional image is detected from a second image capturing device. In some embodiments, the adapter network comprises a plurality of rectified linear units and a plurality of convolutional neural networks.

Figure 3:
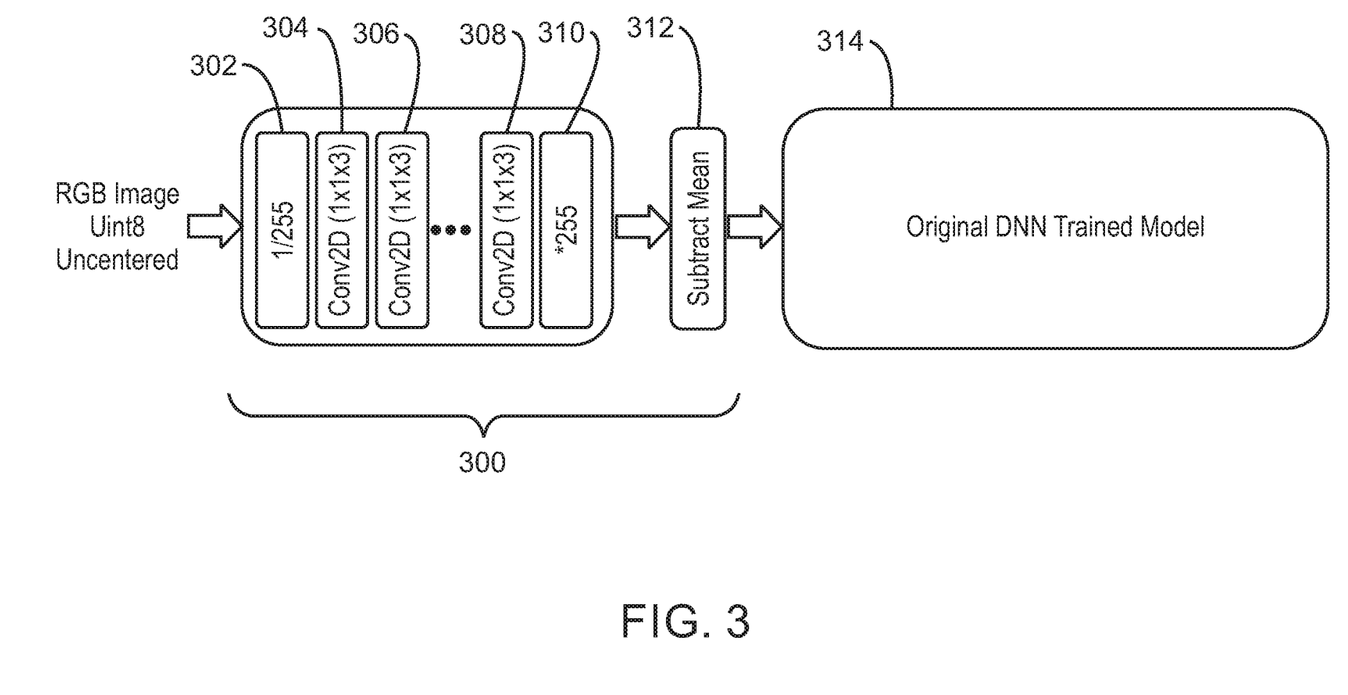
FIG. 3 is an example block diagram of an adapter network according to an embodiment described herein.

FIG. 3 is an example of an adapter network. In some examples, the adapter network 300 can receive any suitable image such as an RGB image in a Uint8 and uncentered or skewed format, among others. In some embodiments, the adapter network 300 can include rectified linear units (Relus). Each image can be divided 302 by 255 so that a range is between zero and one. The range, as referred to herein, indicates the numerical values that each pixel in the image can have. For example, an RGB image can have a range set from 0-255. However, in some examples, processing an image with a range of 0-1 can generate results with a higher accuracy. A two dimensional convolutional network 304 can analyze each pixel individually. The input for the two dimensional convolutional network 304 can include a description of a portion of an image to be analyzed. For example, in a 1×1×3 input, the 1×1 can indicate a single pixel is to be analyzed. Additionally, the three value corresponding to the two dimensional convolutional network 304 can indicate three different colors such as red, green, and blue are to be detected for each pixel. In some embodiments, a range of a number of convolutional networks 304, 306, and 308 can be used to process each pixel. The result of the convolutional networks can be multiplied 310 by 255 and a mean value 312 can be subtracted. In some embodiments, the mean value 312 is calculated as an average of all pixels of the input images across the training set. In some examples, such as when the input includes RGB images, the mean value can correspond to the channels Red, Green, and Blue separately. In some embodiments, the mean value 312 is a part of the pre-trained model. The result of the modified image can be transmitted to the original trained neural network 314.

It is to be understood that the block diagram of FIG. 3 is not intended to indicate that the adapter network 300 is to include all of the components shown in FIG. 3. Rather, the adapter network 300 can include fewer or additional components not illustrated in FIG. 3 (e.g., additional two dimensional convolutional networks, multi-dimensional convolutional networks, etc.).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
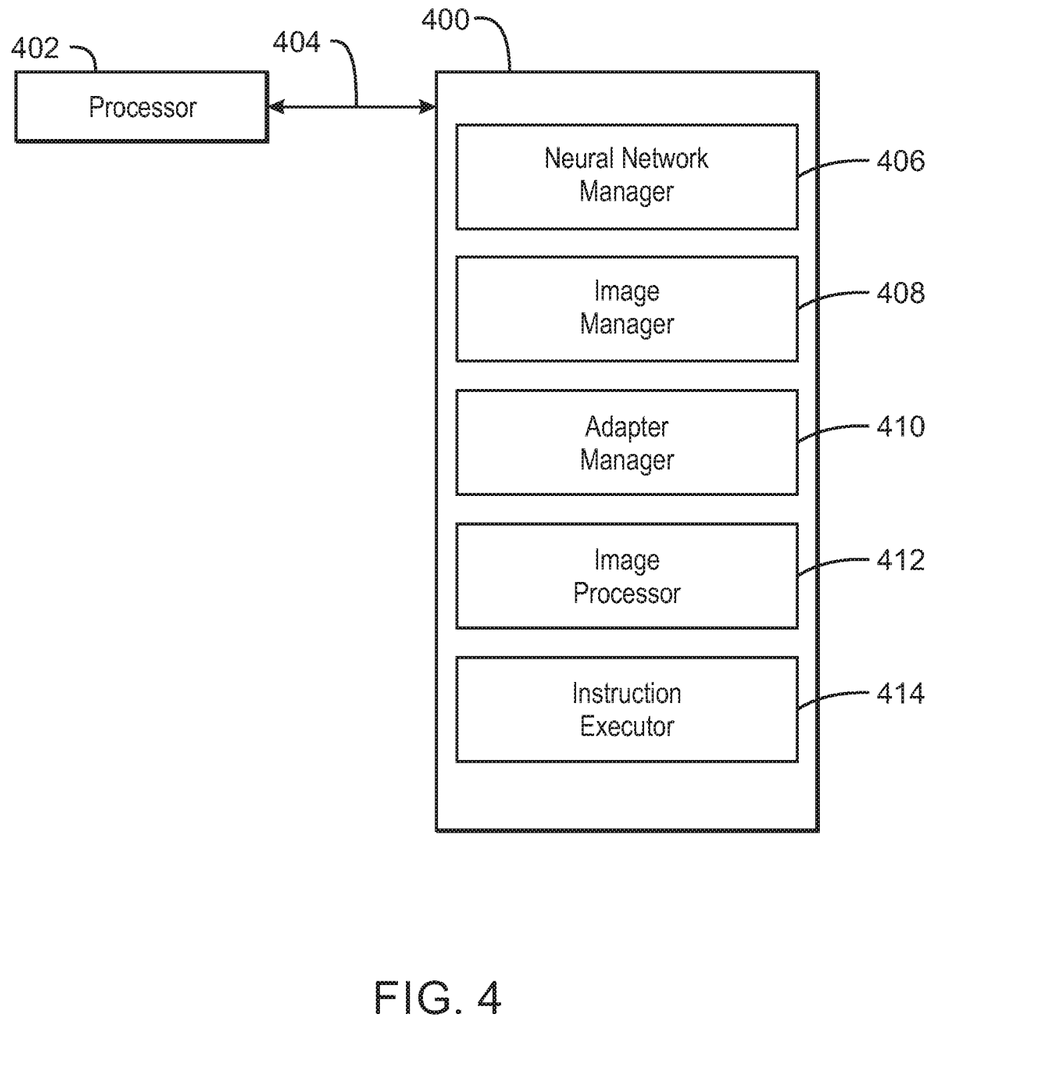
FIG. 4 is a tangible, non-transitory computer-readable medium that can train an adapter network to be used with a trained neural network according to an embodiment described herein.

Referring now to FIG. 4, a block diagram is depicted of an example of a tangible, non-transitory computer-readable medium that can train an adapter network. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, a neural network manager 406 can detect a trained neural network application. An image manager 408 can detect a set of images, wherein the neural network application is not trained with the set of images. An adapter manager 410 can train an adapter network based on the trained neural network application and the set of images, wherein the adapter network is to be trained by freezing weights of the trained neural network and modifying weights of the adapter network. Furthermore, an image processor 412 can use the trained adapter network to process at least one additional image, the processed additional image to be transmitted to the trained neural network to generate an output signal. In some embodiments, an instruction executor 414 can execute an instruction based on the trained neural network and the adapter network.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
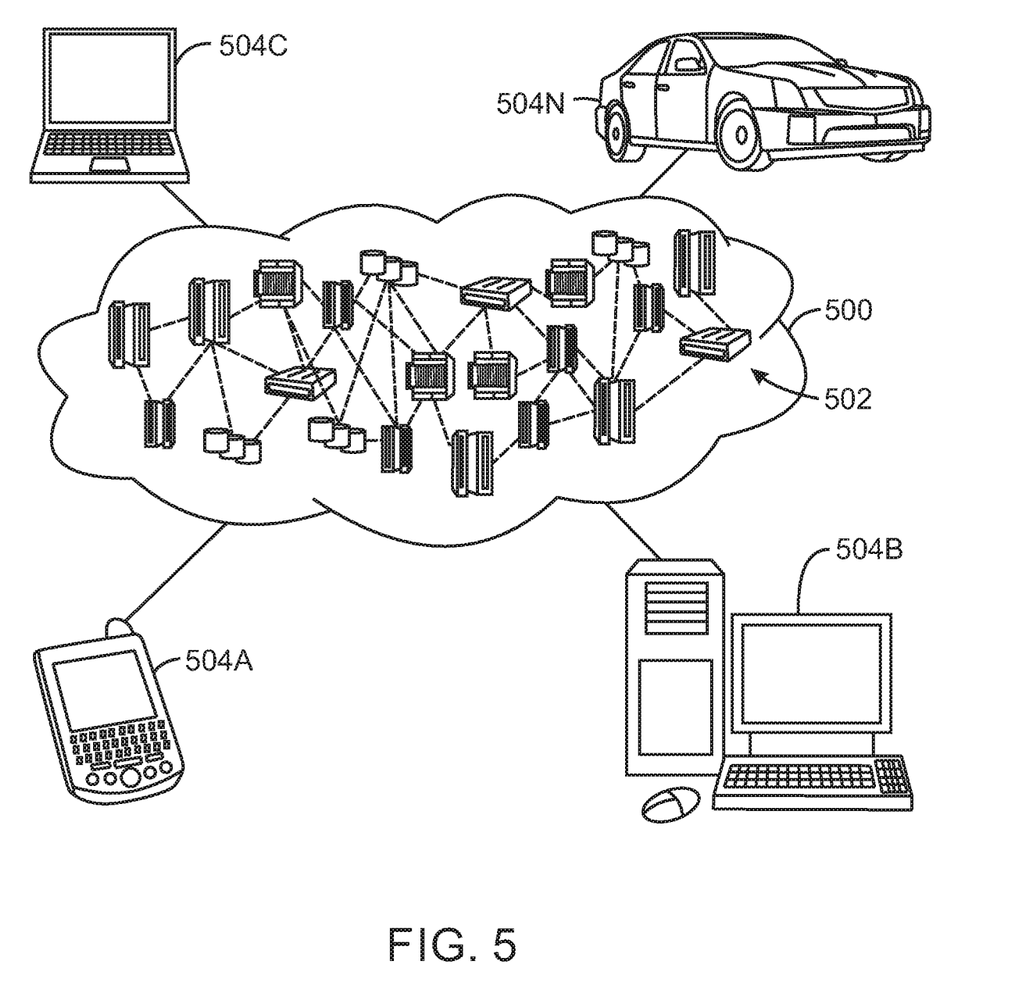
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
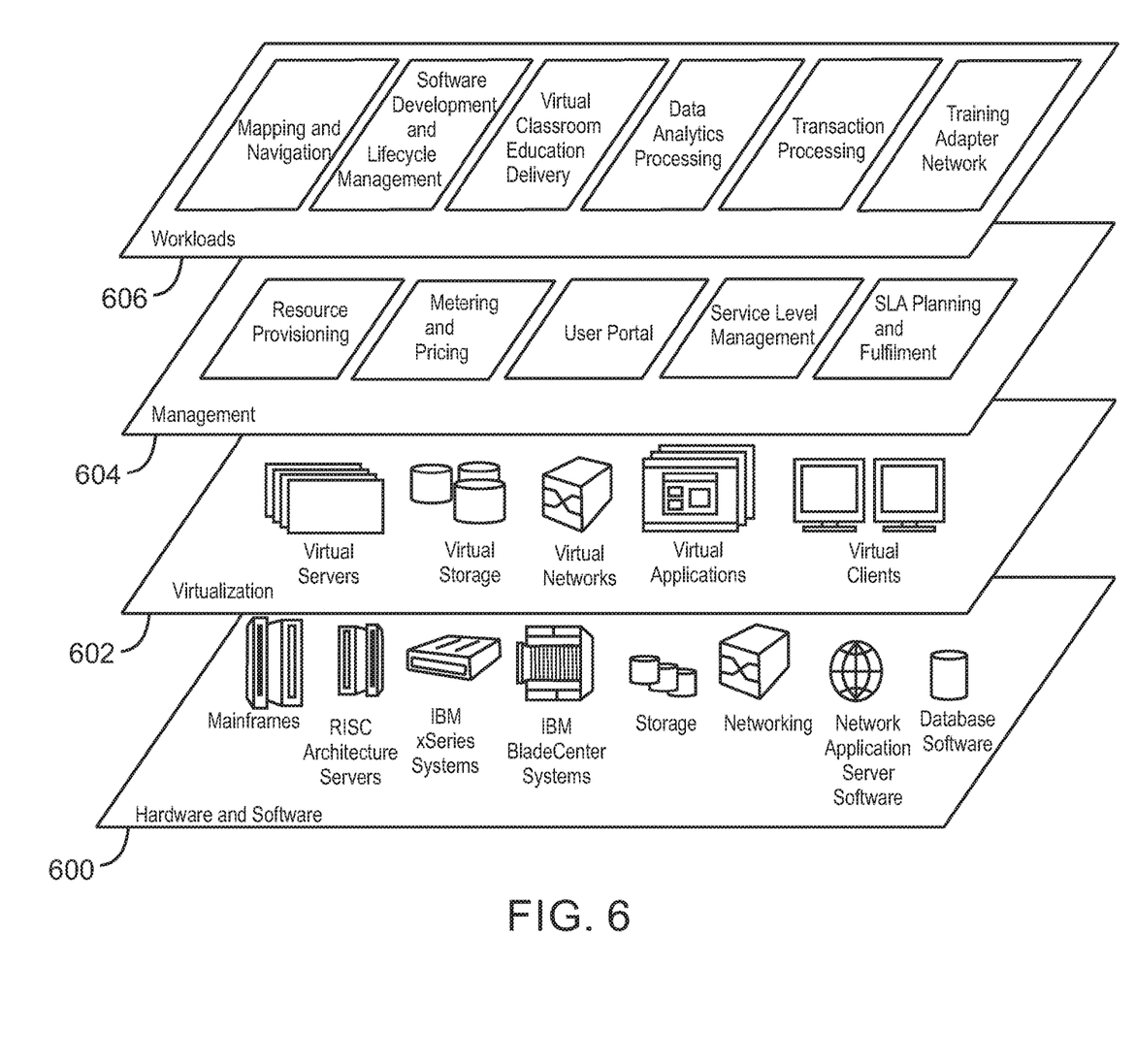
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and training an adapter network.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor to:
detect a trained neural network application;
detect a set of images from a medical device, wherein the trained neural network application is not trained with the set of images;
train an adapter network based on the trained neural network application and the set of images, wherein the adapter network is to be trained by freezing weights of the trained neural network application and modifying weights of the adapter network, wherein the processor is to initialize the weights of the adapter network to weights of a pass through function; and
use the trained adapter network to process at least one additional image, the at least one processed additional image to be transmitted to the trained neural network application to generate an output signal.

2. The system of claim 1, wherein the output signal indicates a medical condition corresponding to the at least one additional image, wherein the at least one image is an x-ray, an ultrasound image, or an MRI image.

3. The system of claim 1, wherein the processor is to use the trained neural network application as a loss function and use a backpropagation technique to determine the weights of the adapter network.

4. The system of claim 1, wherein the processed additional image comprises a modification to the at least one additional image, the modification comprising a modified color, a modified hue, a modified saturation value, or a modified brightness.

5. The system of claim 1, wherein the at least one processed additional image comprises a modified scaling or a modified skew.

6. The system of claim 1, wherein the at least one processed additional image comprises characteristics shared with a sample image from a first image capturing device, wherein the at least one processed additional image is detected from a second image capturing device.

7. The system of claim 1, wherein the processor is to generate the at least one processed additional image by applying a modified sigmoid function associated with the adapter network to the at least one additional image.

8. The system of claim 7, wherein the modified sigmoid function corresponds to a degradation of the medical device over time, and the at least one processed additional image represents characteristics shared with output from the medical device at an earlier date.

9. The system of claim 1, wherein the adapter network comprises a plurality of rectified linear units and a plurality of convolutional neural networks.

10. A method comprising:
detecting a trained neural network application;
detecting a set of images from a medical device, wherein the trained neural network application is not trained with the set of images;
training an adapter network based on the trained neural network application and the set of images, wherein the adapter network is to be trained by freezing weights of the trained neural network application and modifying weights of the adapter network, wherein the weights of the adapter network are initialized to weights of a pass through function; and
using the trained adapter network to process at least one additional image, the at least one processed additional image to be transmitted to the trained neural network application to generate an output signal.

11. The method of claim 10, wherein the output signal indicates a medical condition corresponding to the at least one additional image, wherein the at least one additional image is an x-ray, an ultrasound image, or an MRI image.

12. The method of claim 10, comprising using the trained neural network application as a loss function and use a backpropagation technique to determine the weights of the adapter network.

13. The method of claim 10, wherein the at least one processed additional image comprises a modification to the at least one image, the modification comprising a modified color, a modified hue, a modified saturation value, or a modified brightness.

14. The method of claim 10, wherein the at least one processed additional image comprises a modified scaling or a modified skew.

15. The method of claim 10, wherein the at least one processed additional image comprises characteristics shared with a sample image from a first image capturing device, wherein the at least one processed additional image is detected from a second image capturing device.

16. The method of claim 10, comprising generating the at least one processed additional image by applying a modified sigmoid function associated with the adapter network to the at least one additional image.

17. A computer program product comprising a non-transitory computer readable storage medium having program instructions embodied therewith, wherein the program instructions are executable by a processor to cause the processor to:
detect a trained neural network application;
detect a set of images from a medical device, wherein the trained neural network application is not trained with the set of images;

train an adapter network based on the trained neural network application and the set of images, wherein the adapter network is to be trained by freezing weights of the trained neural network application and modifying weights of the adapter network, wherein the processor is to initialize the weights of the adapter network to weights of a pass through function; and use the trained adapter network to process at least one additional image, the processed additional image to be transmitted to the trained neural network application to generate an output signal.

18. The computer program product of claim 17, wherein the output signal indicates a medical condition corresponding to the at least one additional image, wherein the at least one additional image is an x-ray, an ultrasound image, or an MRI image.

* * * * *